(Model.)
J. F. MOORE.
WAGON BRAKE.
No. 274,017. Patented Mar. 13, 1883.
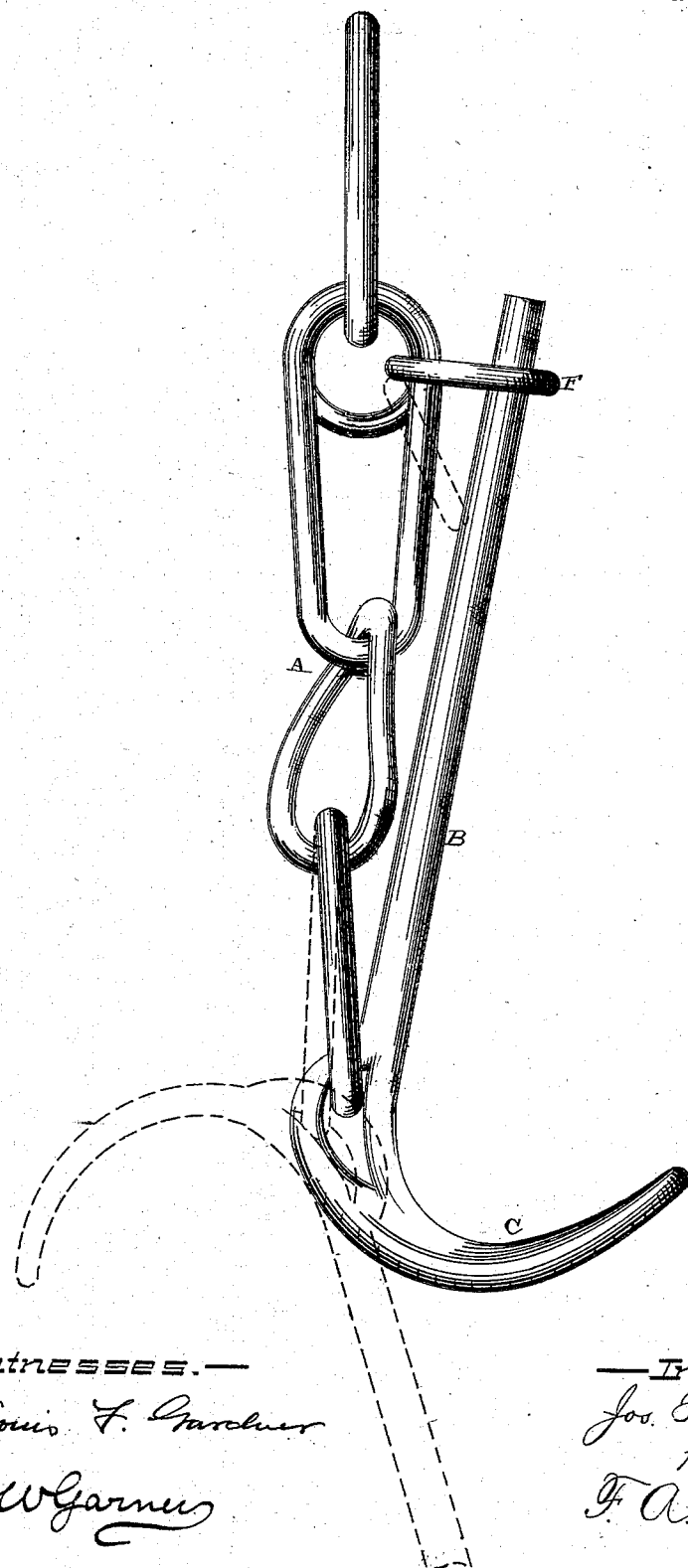

UNITED STATES PATENT OFFICE.

JOSEPH F. MOORE, OF PADUCAH, KENTUCKY.

WAGON-BRAKE.

SPECIFICATION forming part of Letters Patent No. 274,017, dated March 13, 1883.

Application filed December 12, 1882. (Model.)

*To all whom it may concern:*

Be it known that I, JOSEPH FRANKLIN MOORE, of Paducah, in the county of McCracken and State of Kentucky, have invented certain new and useful Improvements in Wagon-Brakes; and I do hereby declare the following to be a full, clear, and exact description of the invention, such as will enable others skilled in the art to which it pertains to make and use it, reference being had to the accompanying drawing, which forms part of this specification.

My invention relates to an improvement in wagon-brakes; and it consists in the combination of a chain which is to be attached to the wagon at any suitable point, a holding-ring attached to the chain, and a hooked lever which is pivoted in the lower end of the last link of the chain, and which is provided with a handle which extends up far enough for the holding-ring to catch over it, as will be more fully described hereinafter.

The object of my invention is to provide a cheap and simple wagon-brake which can be readily and quickly applied to the wheel, and from which the wheel can be released without having to stop the wagon.

The accompanying drawing is a side elevation of my invention, showing the brake in one position in solid lines and in another position in dotted lines.

A represents a chain of any suitable length, which can be secured to the side of the wagon body or bed, or upon any other part of the wagon that may be preferred. Pivoted upon the lower one of the links of the chain is the locking-lever B, which has the hook C formed on its lower end to catch under one of the spokes of the wheel, and which has its upper end formed into a handle or lever, which extends any suitable distance upward. One of the upper links of the chain is divided by a cross-piece, which serves to limit the vertical movement of the holding-ring F. This ring is intended to catch over the upper end of the handle or lever when it is raised upward, and thus hold the hooked end under the spoke, so as to lock the wheel and prevent it from turning. When the lever is not in use it hangs downward, as shown; but after the hooked portion has been made to catch under the spoke of the wheel the handle is turned upward along the chain, and the holding-ring is dropped over its upper end, as shown; or the handle may be caught in the holding-ring, and then the hook caught under the spoke of the wheel without stopping the wagon.

The great advantages of my brake consist in its extreme simplicity, the fact that it can be made by any blacksmith, and the ease with which it is applied. The lever or handle can first be turned upward, so as to catch in the holding-ring, and then it is only necessary to push the curved end of the lever out until it catches behind one of the spokes, and it will thus lock the wheel without stopping the wagon. As the ring has only to be pushed upward off the end of the lever, it is not necessary to stop the wagon at any time so as to throw the brake off. As soon as the ring releases the end of the lever or handle the curved end drops downward away from the spoke and the wheel is released. This brake always extends down along the side of the wheel, ready for instant use.

Having thus described my invention, I claim—

The combination of the chain A, having the ring F, attached to its upper end, with the locking-lever B C, which is attached to the lower end of the chain at a point below the center of the lever, so that when the upper end of the lever is released from the ring it at once drops downward, substantially as shown.

In testimony whereof I affix my signature in presence of two witnesses.

JOSEPH FRANKLIN MOORE.

Witnesses:
 RHEY BOYD,
 A. W. GREIF.